(12) United States Patent
Kwon et al.

(10) Patent No.: US 9,369,006 B2
(45) Date of Patent: Jun. 14, 2016

(54) WIRELESS POWER AND DATA TRANSMISSION SYSTEM

(75) Inventors: Ui Kun Kwon, Hwaseong-si (KR); Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 859 days.

(21) Appl. No.: 13/337,339

(22) Filed: Dec. 27, 2011

(65) Prior Publication Data

US 2012/0299557 A1   Nov. 29, 2012

(30) Foreign Application Priority Data

May 27, 2011   (KR) .................. 10-2011-0050505

(51) Int. Cl.
*H02J 7/00*   (2006.01)
*H02J 17/00*   (2006.01)
*H02J 5/00*   (2016.01)

(52) U.S. Cl.
CPC  *H02J 17/00* (2013.01); *H02J 5/005* (2013.01)

(58) Field of Classification Search
CPC ........ H02J 7/0016; H02J 7/0024; H02J 7/345
USPC ......................................... 320/117, 163, 166
See application file for complete search history.

(56) References Cited

U.S. PATENT DOCUMENTS

| 5,948,004 | A |   | 9/1999 | Weijand et al. |
| 6,118,678 | A | * | 9/2000 | Limpaecher et al. ........... 363/60 |
| 7,535,362 | B2 |   | 5/2009 | Moser et al. |

| 2003/0173996 | A1 | * | 9/2003 | Lewis et al. ................... 326/136 |
| 2006/0187049 | A1 |   | 8/2006 | Moser et al. |
| 2008/0311861 | A1 |   | 12/2008 | Lepek |

FOREIGN PATENT DOCUMENTS

| CN | 101809687 A | 8/2010 |
| CN | 102044915 A | 5/2011 |
| CN | 102570624 A | 7/2012 |
| CN | 103109439 A | 5/2013 |
| EP | 1 798 867 A2 | 6/2007 |
| JP | 08-182213 A | 7/1996 |
| JP | 8-308237 A | 11/1996 |
| JP | 10-201245 A | 7/1998 |

(Continued)

OTHER PUBLICATIONS

Partial European Search Report issued Sep. 24, 2012 in counterpart European Application No. 12155746.6 (5 pages, in English).

(Continued)

*Primary Examiner* — Edward Tso
*Assistant Examiner* — Aaron Piggush
(74) *Attorney, Agent, or Firm* — NSIP Law

(57) ABSTRACT

Provided is a wireless power data transmission system that may transmit wireless power and may transmit data using wireless power. A wireless power transmitter may include capacitors, and may convert an electrical connection of the capacitors to a parallel connection for charging. The wireless power transmitter may also convert the electrical connection of at least two of the capacitors to a series connection for discharging.

11 Claims, 8 Drawing Sheets

(56) References Cited

FOREIGN PATENT DOCUMENTS

| | | | |
|---|---|---|---|
| JP | 10-303790 A | 11/1998 |
| JP | 11-341825 A | 12/1999 |
| JP | 2001-061235 A | 3/2001 |
| JP | 2001-514946 A | 9/2001 |
| JP | 2002-035057 A | 2/2002 |
| JP | 2003-047236 A | 2/2003 |
| JP | 2003-348773 A | 12/2003 |
| JP | 2007-306240 A | 11/2007 |
| KR | 10-2009-0008255 A | 1/2009 |
| KR | 10-2010-0017324 A | 2/2010 |
| WO | WO 2007/030864 A1 | 3/2007 |
| WO | WO 2011/062827 A2 | 5/2011 |

OTHER PUBLICATIONS

European Search Report issued Jan. 21, 2013 in counterpart European Patent Applicaion No. 12155746.6-2210 (9 pages, in English).

Chinese Office Action issued in corresponding Chinese Application No. 201210084263.6 on Jun. 3, 2015 (pp. 1-28 in English; pp. 29-43 in Chinese).

Chinese Office Action issued Jan. 22, 2016 in counterpart Chinese Application No. 201210084263.6 (pp. 1-31 in English; pp. 42-47 in Chinese).

Japanese Office Action issued Mar. 29, 2016 in counterpart Japanese Application No. 2012-101252 (pp. 1-10 in English; pp. 11-19 in Japanese).

* cited by examiner

WIRELESS POWER AND DATA TRANSMISSION SYSTEM

CROSS-REFERENCE TO RELATED APPLICATION(S)

This application claims the benefit under 35 U.S.C. §119(a) of Korean Patent Application No. 10-2011-0050505, filed on May 27, 2011, in the Korean Intellectual Property Office, the entire disclosure of which is incorporated herein by reference for all purposes.

BACKGROUND

1. Field

The following description relates to transmitting wireless power and to data transmission while transmitting wireless power.

2. Description of Related Art

As demand for and use of portable electronic devices has increased, the use of wired power supplies for these devices may be regarded as inconvenient. Studies on wireless power transmission have been conducted to address inconveniences of wired power supplies and the capacity of conventional batteries. For example, some studies have been associated with a short distance wireless power transmission. The short distance wireless power transmission may correspond to an implementation in which a distance between a transmission coil and a reception coil is sufficiently shorter than a wavelength in an operating frequency. A wireless power transmission and reception system using a resonance characteristic may include a source providing power and a target being provided with power.

SUMMARY

In one general aspect, there is provided a wireless power transmitter, including a plurality of capacitors; and a converting unit to convert an electrical connection of the plurality of capacitors to a parallel connection when charging the plurality of capacitors, and to convert an electrical connection of at least two capacitors of the plurality of capacitors to a series connection when discharging the plurality of capacitors.

The wireless power transmitter may further include a power input unit to charge the plurality of capacitors, connected in parallel, with power supplied from a power supply, and a power transmitting unit to transmit power stored in the at least two capacitors of the plurality of capacitors, connected in series.

The wireless power transmitter may further include the converting unit converting an electrical connection of the plurality of capacitors to a parallel connection, and converting the electrical connection of the plurality of capacitors from the parallel to the series connection, a power input unit charging the plurality of capacitors, connected in parallel, with power supplied from the power supply, and a power transmitting unit transmitting power stored in the plurality of capacitors, connected in series.

Each of the plurality of capacitors may have substantially the same capacitance.

The wireless power transmitter may further include a controller to control switches connected to the plurality of capacitors, wherein, when the plurality of capacitors are charged with a predetermined amount power, the controller controls the switches to change plurality of the capacitors from the parallel connection to the series connection.

The converting unit may electrically connect the plurality of capacitors to the power input unit when the plurality of capacitors are connected in parallel, and the converting unit may electrically connect the plurality of capacitors to the power transmitting unit when the plurality of capacitors are connected in series.

The controller may electrically connect, in series, the power transmitting unit to a predetermined number of the plurality of capacitors, wherein the predetermined number of capacitors is selected to control a resonance frequency of a source resonator.

The power input unit may charge the plurality of capacitors connected in parallel with power supplied from a DC power supply or an AC power supply.

When the plurality of capacitors, connected in series, discharge to a level less than or equal to a predetermined level or after a predetermined time passes, the controller may control switches connected to the plurality of capacitors, connected in series, so that the capacitors are connected in parallel.

The converting unit may include a first switch unit to control an electrical connection between the power input unit and the plurality of capacitors and to control an electrical connection between the power transmitting unit and the plurality of capacitors, a second switch unit to control an electrical connection between the plurality of capacitors, and a third switch unit to control an electrical connection between the plurality of capacitors and a ground.

In another general aspect, there is provided a data transmitter using a wireless power, the data transmitter including a plurality of capacitor sets, a power input unit to charge the plurality of capacitor sets with power supplied from a power supply, and a transmitting unit to transmit power stored in the plurality of capacitor sets, and each of plurality of capacitor set includes a plurality of capacitors connected to the power input unit or the transmitting unit, according to an electrical connection, and a converting unit to convert the electrical connection.

The power input unit may simultaneously charge the respective capacitors, or the power input unit may selectively charge the capacitors.

The converting unit may convert the electrical connection to a parallel connection for charging the plurality of capacitors from to the power input unit, and may convert the electrical connection to a series connection for discharging the plurality of capacitors to the transmitting unit.

The data transmitter may further include a controller to control a plurality of switches connected to the plurality of capacitors, wherein the plurality of switches may be controlled to physically separate the power input unit and the transmitting unit.

The plurality of capacitor sets may include a first capacitor set and a second capacitor set, wherein the plurality of capacitors of the first capacitor set may include a number N capacitors, and the plurality of capacitors of the second capacitor set may include a number M capacitors.

The converting unit may control of switches connected to the N capacitors of the plurality of switches to convert an electrical connection of the N capacitors to a series connection or a parallel connection, and may control of switches connected to the M capacitors of the plurality of switches to convert an electrical connection of M capacitors to a series connection or a parallel connection.

Each of the N capacitors of the first capacitor set may have substantially the same capacitance, and each of the M capacitors of the second capacitor set may have substantially the same capacitance.

The transmitting unit may selectively transmit data modulated based on at least one of an amount of power stored in the first capacitor set including the N capacitors connected in series and an amount of power stored in the second capacitor set including the M capacitors connected in series.

The controller may electrically connect, in series, the transmitting unit to a predetermined number of capacitors of the plurality of capacitors, wherein the predetermined number of capacitors may be selected to control a resonance frequency of a source resonator.

In still another general aspect, there is provided a wireless power receiver, including at least one capacitor, a receiving unit to receive wireless power to charge the at least one capacitor, a power output unit to transfer power stored in the at least one capacitor to a load, and a switch unit to control at least one switch connected to the at least one capacitor to prevent the receiving unit from being electrically connected to the power transmitting unit.

The switch unit may control the at least one switch based on an amount of power stored in the at least one capacitor, to electrically connect the at least one capacitor to the receiver or the power output unit.

In yet another general aspect, there is provided a data receiver using a wireless power, including at least one capacitor, a receiving unit to receive wireless power to charge the at least one capacitor, a demodulating unit to demodulate data transmitted from a source resonator, based on an amount of power stored in the at least one capacitor, and a power output unit to transfer, to a load, the power stored in the at least one capacitor and the demodulated data.

The data receiver may further include a switch unit to control at least one switch connected to the at least one capacitor to prevent the receiving unit from being electrically connected to the power output unit.

In an additional general aspect, there is provided a method of wirelessly transmitting power, including charging a first capacitor unit from a power supply, disconnecting the first capacitor unit from the power supply and connecting the first capacitor unit to a transmission coil, discharging the first capacitor unit to transmit power from the transmission coil to a reception coil, charging a second capacitor unit from the reception coil, disconnecting the second capacitor unit from the reception coil and connecting the second capacitor unit to a load, and discharging the second capacitor unit to supply power to the load.

The first capacitor unit may include a plurality of capacitors, and the method may further include connecting the plurality of capacitors in a parallel manner when the first capacitor unit is charged from the power supply, and connecting at least a portion of the plurality of capacitors in a series manner when the first capacitor unit is discharged to the transmission coil.

The method may further include modulating data based on power stored in the first capacitor unit, transmitting the modulated data from the transmission coil to the reception coil, and demodulating the modulated data based on amount of power stored in the second capacitor unit.

In a further general aspect, there is provided a wireless power transmitting method, the method including charging N capacitors connected in parallel with power supplied from a power supply, converting an electrical connection of the N capacitors connected in parallel to a series connection and converting the electrical connection of the N capacitors connected in series to a parallel connection, and transmitting power stored in the N capacitors connected in series through magnetic coupling between a source resonator and a target resonator.

The wireless power transmitting method may further include controlling switches connected to the N capacitors connected in parallel so that the N capacitors are connected in series when the N capacitors connected in parallel are charged.

The controlling includes controlling the switches connected to the N capacitors connected in series so that the N capacitors are connected in parallel when the N capacitors discharge to a level less than or equal to a predetermined value or after a predetermined time passes.

Examples described herein may include a wireless power and data transmission system in which a plurality of capacitors connected is charged when the plurality of capacitors is connected in parallel and thus, may generate a relatively high capacity equivalent capacitor and may transfer a relatively high amount of power to a power transmitting unit using the equivalent capacitor.

Examples described herein may include a wireless power and data transmission system that may include a plurality of capacitors connected in series, may generate a relatively low capacity equivalent capacitor, and may provide a source resonator having a relatively high quality factor (Q) value using the equivalent capacitor and thus, may transfer a relatively high amount of power to a target device.

Examples described herein may include a wireless power and data transmission system in which a single power supply generates a quantized voltage using capacitor sets, each capacitor set including a different number of capacitors, and thus, may simultaneously transmit a wireless power and data.

Examples described herein may include a wireless power and data transmission system that configures capacitors to be connected in series by selectively selecting a plurality of capacitors charged in parallel and thus, may variably change a resonance frequency of a resonator.

Other features and aspects may be apparent from the following detailed description, the drawings, and the claims.

Figure 1:
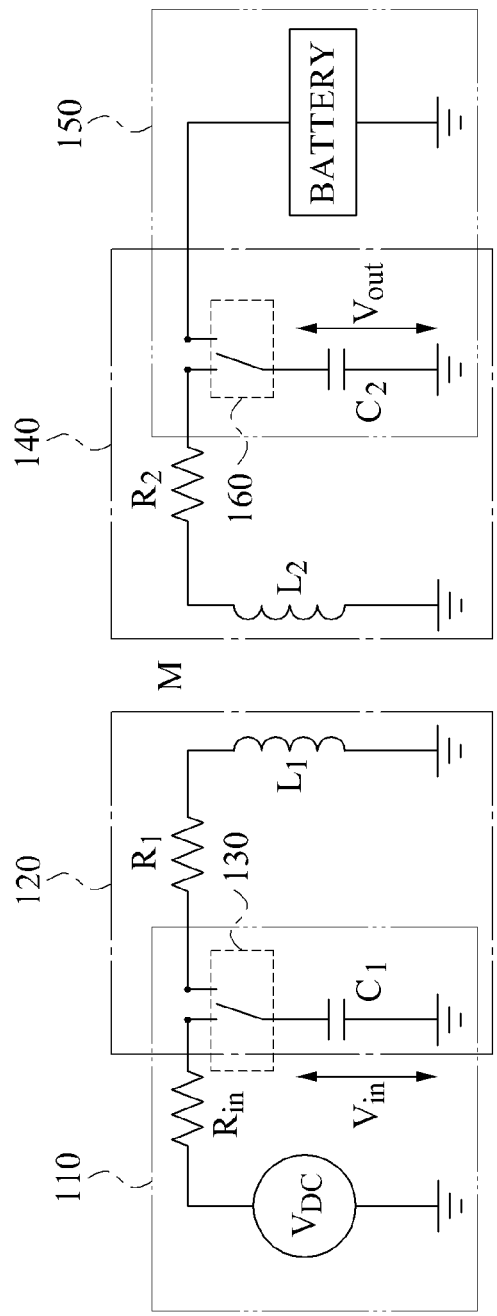
FIG. 1 is a diagram illustrating an equivalent circuit of a short distance wireless power transmission system in which a power input unit and a power transmitting unit are physically separated and in which a receiving unit and a power output unit are physically separated, according to example embodiments.

Throughout the drawings and the detailed description, unless otherwise described, the same drawing reference numerals should be understood to refer to the same elements, features, and structures. The relative sizes and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

A wireless power transmission system according to various example embodiments described herein may have a source-target structure, including a source and a target. The wireless power transmission system may include a wireless power transmitter corresponding to the source and a wireless power receiver corresponding to the target.

To improve wireless power transmission efficiency in a circuit in which a power input unit of the wireless power transmitter is physically connected to a transmission coil and in which a power output unit of the wireless power receiver is physically connected to a reception coil, certain factors may be taken into account.

Factors such as frequency adjustment, impedance matching, a power amplifier efficiency, and implementation of a rectifier may be considered based on a change in an operating environment to improve the wireless power transmission efficiency in the circuit in which the power input unit of the wireless power transmitter is physically connected to the transmission coil and in which the power output unit of the wireless power receiver is physically connected to the reception coil. As an example, a change in an operating environment might include a change in a distance between resonators and a change in an impedance of the target.

Accordingly, the wireless power transmission system according to example embodiments may use a circuit in which the power input unit of the wireless power transmitter is physically separated from the transmission coil and in which the power output unit of the wireless power receiver is physically separated from the reception coil. Thus, the wireless power transmission system may reduce the effects of factors such as impedance mismatching and the like.

In the wireless power transmission system, the power input unit and the transmission coil may be physically separated due to capacitors located between the power input unit and the transmission coil. When the power input unit is connected to the capacitors, the capacitors may not have a connection to the transmission coil. The capacitors may be charged by the power input unit, and the capacitors may discharge when connected to the transmission coil. The capacitors may not be simultaneously connected to both the power input unit and the transmission coil.

The reception coil and the power output unit may be physically separated by capacitors located between the reception coil and the power output unit. When the reception coil receives power discharged from the transmission coil, through magnetic coupling between the transmission coil and the reception coil, the capacitors may be connected to the reception coil. Accordingly, the capacitors may be charged by the reception coil. In this example, the capacitors may be separated from the power output unit. Furthermore, the charged capacitors may be connected to the power output unit, and the power output unit may transfer power to a target device or a load.

The wireless power transmission system may control a timing for connecting the capacitors to the power input unit or the transmission coil, and may control a timing for connecting the capacitors to the reception coil or the power output unit.

A resonator having a relatively high quality factor (Q) value may be implemented, in order to provide relatively high transmission efficiency in transferring power between the transmission coil and the reception coil in the wireless power transmission system. Here, the Q value may be inversely proportional to a square root of a capacitance of a resonator. Accordingly, a capacitor having a relatively low capacitance may be used to design the resonator having the relatively high Q value.

When a capacitor having a relatively low capacitance is used, a power capacity may decrease. Here, the power capacity may correspond to an amount of power, through the power input unit, with which the capacitor is charged. Therefore, although efficiency is relatively high in the transmission coil, the amount of power to be transferred to the reception coil may decrease.

A capacitor charged by the power input unit may be a capacitor having a relatively high capacity to increase the power capacity, and a capacitor connected to the transmission coil may be a capacitor having a relatively low capacity to improve transmission efficiency with the reception coil.

As an example, a combination of capacitors that may provide different levels of input voltages from a single input power source may be used. The wireless power transmission system may transmit and receive data according to the different levels of input voltages.

The wireless power transmission system may be implemented in a variety of systems, for example, wireless charging of a cellular phone, a wireless television (TV), and the like. The wireless power transmission system may also be implemented in system of bio-healthcare fields. For example, the wireless power transmission system may be utilized in remotely transmitting power to a device inserted in a human body or in wirelessly transmitting power to a bandage-type device for measuring a heart rate.

As another example, the wireless power transmission system may be applicable to a remote control of an information storage device that does not include a power source. In this example, the wireless power transmission system may remotely supply power to operate the information storage device and may read information stored in the information storage device. For example, information may be read from the information device while power is remotely supplied to the information device.

FIG. 1 illustrates an equivalent circuit of a near-field wireless power transmission system in which a power input unit 110 and a power transmitting unit 120 are physically separated and in which a receiving unit 140 and a power output unit 150 are physically separated, according to example embodiments.

Referring to FIG. 1, the near-field wireless power transmission system may be configured as a source-target structure including a source and a target. The wireless power transmission system may include a wireless power transmitter corresponding to the source and a wireless power receiver corresponding to the target.

The wireless power transmitter includes the power input unit 110, the power transmitting unit 120, and a switch unit 130. The power input unit 110 may receive energy from a power supply, and may store the energy in a capacitor. The switch unit 130 may connect the capacitor to the power input unit 110 while the capacitor stores the energy, and may connect the capacitor to the power transmitting unit 120 while the capacitor discharges the stored energy. Here, the switch unit 130 may prevent the capacitor from being simultaneously connected to both the power input unit 110 and the power transmitting unit 120.

The power transmitting unit 120 may emit electromagnetic energy that is received by the receiving unit 140. Particularly, a transmission coil ($L_1$) of the power transmitting unit 120 may transfer energy through magnetic coupling with a reception coil ($L_2$) of the receiving unit 130. The magnetic coupling between $L_1$ and $L_2$ may be expressed as mutual inductance (M).

The power input unit 110 may be modeled by a circuit including an input voltage ($V_{DC}$), an internal resistor ($R_{in}$), and a capacitor ($C_1$). The power transmitting unit 120 may be modeled by a circuit including basic circuit devices ($R_1$, $L_1$, and $C_1$), based on physical properties corresponding to the power transmitting unit 120. The switch unit 130 may be modeled by one or more switches. An active element that performs ON and OFF functions may be used as a switch. R denotes a resistor, L denotes an inductor, and C denotes a capacitor. A voltage applied to capacitor $C_1$ may be expressed as $V_{in}$.

The wireless power receiver includes the receiving unit 140, the power output unit 150, and a switch unit 160. The receiving unit 140 may receive electromagnetic energy from the power transmitting unit 120. The receiving unit 140 may store received electromagnetic energy in a capacitor connected to the receiving unit 140. The switch unit 160 may connect the capacitor to the receiving unit 140 while storing energy in the capacitor, and may connect the capacitor to the power output unit 150 while transferring the energy stored in the capacitor to a load. The switch unit 160 may prevent the capacitor from being simultaneously connected to both the receiving unit 140 and the power output unit 150.

The reception coil $L_2$ of the receiving unit 140 may receive energy through magnetic coupling with the transmission coil $L_1$ of the power transmitting unit 120. As an example, the power output unit 150 may transfer received power to a battery. As another example, the power output unit 150 may transfer power to the load or a target device.

The receiving unit 140 may be modeled by a circuit including basic circuit devices ($R_2$, $L_2$, and $C_2$), based on physical properties corresponding to the receiving unit 140. The power output unit 150 may be modeled by a circuit including a capacitor ($C_2$) and a battery. The switch unit 160 may be modeled by one or more switches. A voltage applied to capacitor $C_2$ may be expressed as $V_{out}$.

Since the source resonator ($R_1$, $L_1$, and $C_1$) is separated from the power source supplying power and the target resonator ($R_2$, $L_2$, and $C_2$) is separated from the target device, the wireless power transmission system may operate without frequency adjustment and impedance matching based on a change in operating environment. Here, power transferred to the source resonator may be determined based on power stored in a capacitor connected to the source resonator, and power transferred to the target device may be determined based on power stored in a capacitor connected to the target device. Transmission efficiency may be determined based on capacitor charging and transfer of stored power.

For example, when a single capacitor $C_1$ is used as illustrated in FIG. 1, a capacitance of a capacitor connected to the power input unit 110 may be substantially the same as a capacitance of a capacitor connected to the power transmitting unit 120. A charging capacity of a capacitor may be proportional to a capacitance of the capacitor, and a Q value of a source resonator may be inversely proportional to a square root of the capacitance. Accordingly, in this example, the Q value of the source resonator may not be increased if the charging capacity of the capacitor is increased.

To both increase the Q value of the source resonator and increase the charging capacity of the capacitor, a plurality of capacitors may be used. In this instance, the charging capacity of the capacitor may be increased for the power input unit 110, and the Q value may be increased for the power transmitting unit 120, based on a connection type of the plurality of capacitors.

Figure 2:
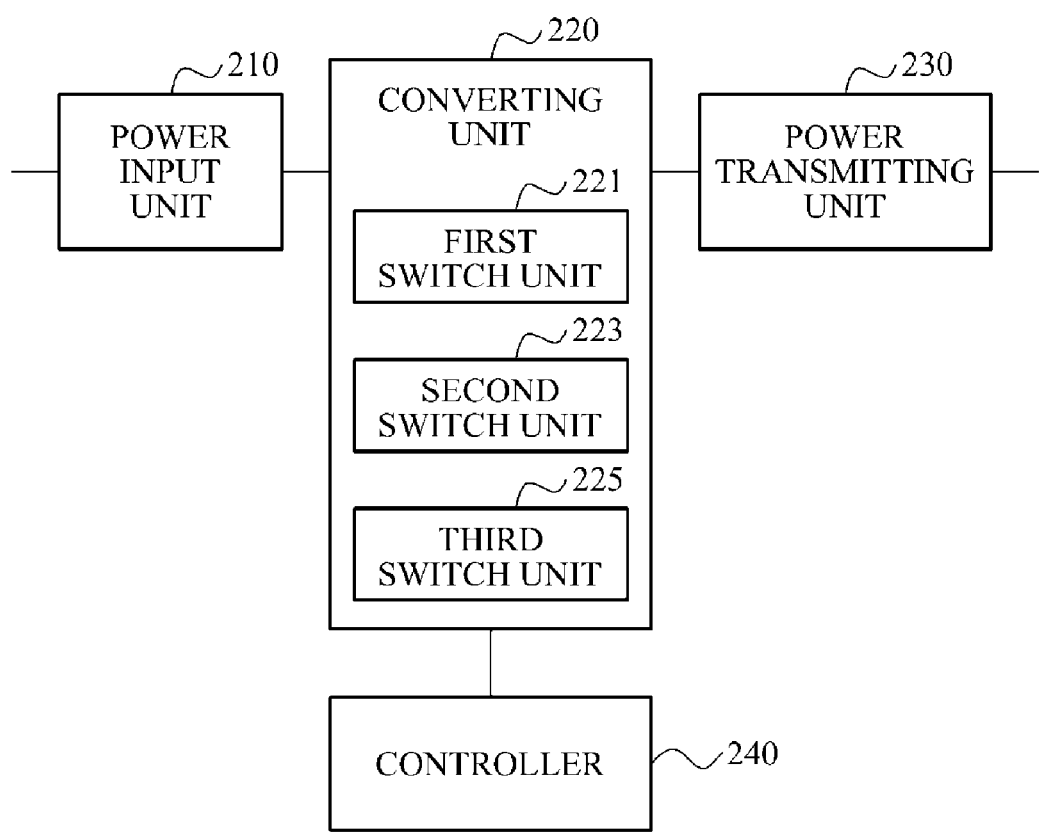
FIG. 2 is a block diagram illustrating a wireless power transmitter according to example embodiments.

FIG. 2 illustrates a wireless power transmitter according to example embodiments.

Referring to FIG. 2, the wireless power transmitter includes a power input unit 210, a converting unit 220, a power transmitting unit 230, and a controller 240.

The power input unit 210 may charge one or more capacitors with power supplied from a power supply. The power supply may be included in the power input unit 210, or may be positioned on an external side of the power input unit 210. The power input unit 210 may charge the one or more capacitors with power supplied from a DC power supply or an AC power supply.

The power input unit 210 may readily charge the one or more capacitors using a DC power supply. If the power input unit 210 uses an AC power supply, the power input unit 210 may convert an AC power to a DC power using an AC/DC converter or may include a switch to appropriately adjust timing so as to charge the one or more capacitors.

The converting unit 220 may convert an electrical connection of the one or more capacitors.

As an example, when a plurality of capacitors is connected to the power input unit 210, the converting unit 220 may convert the electrical connection to a parallel connection, so that the capacitors are connected in parallel. A total capacitance of the capacitors connected in parallel may be substantially the same as a sum of the respective capacitances of each of the capacitors and thus, the total capacitance may be greater than the individual respective capacitances of each of the capacitors. The converting unit 220 may convert the electrical connection of the capacitors to the parallel connection and thus, the power input unit 210 may provide a greater amount of power for charging as compared to a single capacitor.

When the capacitors are connected to the power transmitting unit 230, the converting unit 220 may convert the electrical connection to a series connection, so that the capacitors are connected in series. A total capacitance of the capacitors connected in series may be lower than the individual respective capacitances of each of the capacitors. In this example, each of the capacitors may have approximately the same capacitance. The converting unit 220 may convert the electrical connection of the capacitors to the series connection and thus, may increase the Q value of a source resonator included in the power transmitting unit 230 as compared to a single capacitor.

When it is determined that the power input unit 210 has completed charging of capacitors connected in parallel, the converting unit 220 may convert the electrical connection of the charged capacitors to a series connection. Completion of the charging may be determined based on a predetermined maximum threshold value for power that may be stored in the capacitors, or may be determined based on stability of the capacitors. In this example, the stability may be determined based on the capacitors that are free from defects at the level of physical.

As another example, the converting unit 220 may convert the electrical connection of the capacitors by turning ON and OFF switches connected to the capacitors. Information associated with which switches are to be turned ON and OFF among the switches connected to the capacitors may be provided by the controller 240. The controller 240 may generate a control signal based on a level of energy stored in the capacitors, so that the converting unit 220 may control the switches connected to the capacitors. The controller 240 may measure or sense energy stored in the capacitors. In this example, the stored energy may be measured by a measuring unit or may be sensed by a sensor.

The converting unit 220 includes a first switch unit 221, a second switch unit 223, and a third switch unit 225. The first switch unit 221 may turn ON and OFF an electrical connection between the power input unit 210 and the capacitors, and may turn ON and OFF an electrical connection between the power transmitting unit 230 and the capacitors. The second switch unit 223 may turn ON and OFF an electrical connection between the capacitors. The third switch unit 225 may turn ON and OFF an electrical connection between the capacitors and a ground.

For example, to connect the power input unit 210 and the capacitors in parallel, the first switch unit 221 may turn ON the electrical connection between the power input unit 210 and the capacitors, the second switch unit 223 may turn OFF the electrical connection between capacitors, and the third switch unit 225 may turn ON the electrical connection between the capacitors and the ground. To connect the power transmitting unit 230 and the capacitors in series, the first switch unit 221 may turn ON the electrical connection between the power transmitting unit 230 and the capacitors, the second switch unit may turn ON the electrical connection between the capacitors, and the third switch unit 225 may OFF turn the electrical connection between the capacitors and the ground.

The capacitors may be separated from the power transmitting unit 230 while the capacitors are connected to the power input unit 210. The power input unit 210 and the power transmitting unit 230 may be separated from each other by switching ON and OFF of the converting unit 220.

Here, the power stored in the capacitors may be transferred to the source resonator of the power transmitting unit 230 by connecting the capacitors to the source resonator. That is, the capacitors may be connected to the source resonator after the converting unit 220 converts the electrical connection of the capacitors from a parallel connection to a series connection.

The power transmitting unit 230 may transmit, through a magnetic coupling, power transferred to the source resonator. When the capacitors that are charged and connected in series are connected to the source resonator, the power transmitting unit 230 may transmit the power stored in the capacitors through the magnetic coupling.

The power input unit 210 and the power transmitting unit 230 may operate independently. Accordingly, the power input unit 210 and the power transmitting unit 230 may be implemented to not be substantially affected by a change in an operating environment. The power input unit 210 may use a plurality of capacitors and thus, may generate power for a wireless power receiver without using a power amplifier.

The controller 240 may electrically connect a predetermined number of capacitors from among the plurality of capacitors to the power transmitting unit 230, and may control a resonance frequency of the source resonator. As one example, the resonance frequency of the source resonator may change based on a number of capacitors connected to the power transmitting unit 230. When a wireless power receiver that is different from a target for the wireless power transmission receives power, the controller 240 may change the reference frequency so as to substantially prevent the reception of power by the different receiver. For example, the controller 240 may be applicable to another communication scheme, such as reducing interference from another wireless power receiver by changing a resonance frequency.

Figure 3:
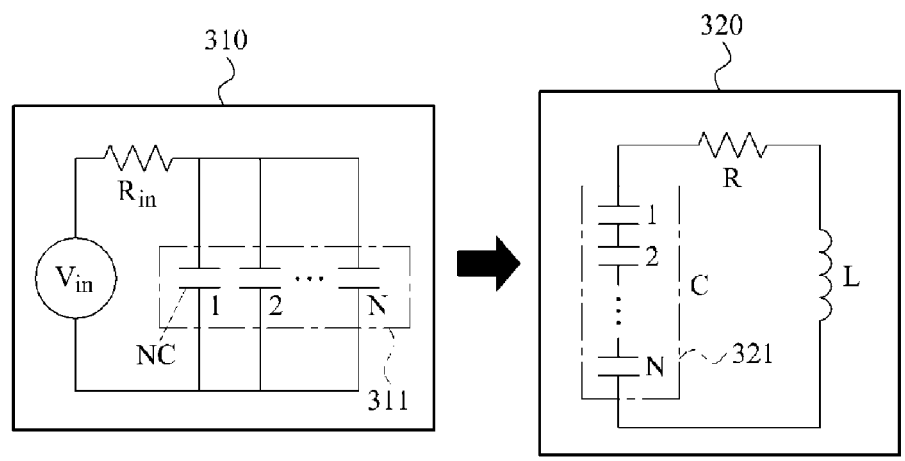
FIG. 3 is a diagram illustrating a wireless power transmitter according to example embodiments.

FIG. 3 illustrates a wireless power transmitter according to example embodiments.

Referring to FIG. 3, the power input unit 310 may charge capacitors 311 connected in parallel, and the power transmitting unit 320 may transmit power supplied from the capacitors 321 connected in series. The power supplied from capacitors 321 may be transmitted through a transmission coil (L). In the example illustrated in FIG. 3, the number of the capacitors 321 is N.

Here, when a respective capacitance of each of the N capacitors 311 connected in parallel is N*C, a total capacitance of the N capacitors 311 connected in parallel may be N*N*C. Further, when a respective capacitance of each of the N capacitors 321 connected in series is N*C, a total capacitance of the N capacitors 321 connected in series may be C.

As an example, the power input unit 310 may charge the N capacitors 311 connected in parallel, so as to obtain a charging capacity of N*N*C. The power transmitting unit 320 may configure a source resonator having a relatively high Q value using the N capacitors 321 connected in series. The power input unit 310 may store energy in an equivalent capacitor having a relatively high capacity, and the power transmitting unit 320 may configure the source resonator having the relatively high Q value through an equivalent capacitor having a relatively low capacity.

As another example, the power input unit 310 may store, in the N capacitors 311 connected in parallel, power N^2 times greater than a single capacitor of which capacitance is C, and the power transmitting unit 320 may configure the source resonator using approximately the same capacitance of C. Therefore, the power transmitting unit 320 may configure the source resonator having the same Q value as the single capacitor having the capacitance of C, and may provide a greater amount of power to the wireless power receiver.

Figure 4:
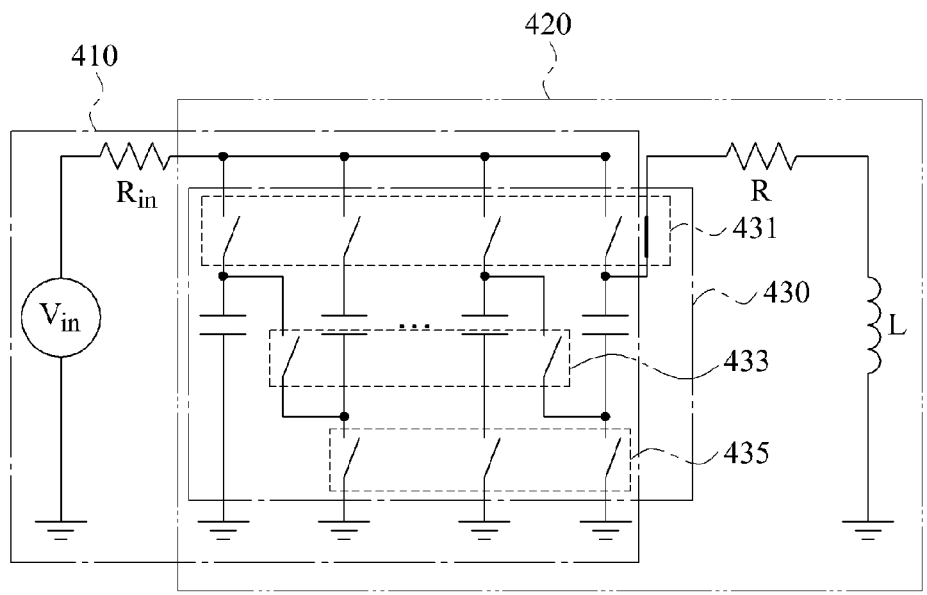
FIG. 4 is a diagram illustrating an example of a wireless power transmitter according to example embodiments.

FIG. 4 illustrates an example of a wireless power transmitter according to example embodiments.

Referring to FIG. 4, the wireless power transmitter includes a power input unit 410, a power transmitting unit 420, and a converting unit 430.

The power input unit 410 may charge capacitors connected in parallel, with power supplied from an input voltage ($V_{in}$). In this example, the converting unit 430 may convert an electrical connection of the capacitors to a parallel connection. The converting unit 430 may include a first switch unit 431, a second switch unit 433, and a third switch unit 435. In this example, the first switch unit 431 may turn ON an electrical connection between capacitors and the input voltage $V_{in}$. The second switch unit 433 may turn OFF an electrical connection between the capacitors. The third switch unit 435 may turn ON an electrical connection between the capacitors and ground. When a respective capacitance of each of the capacitors is N*C and a number of the capacitors is N, a total capacitance of the capacitors connected in parallel may be N*N*C.

The power transmitting unit 420 may transmit power stored in the capacitors through magnetic coupling between a source resonator and a target resonator. The source resonator may be approximated by a series RLC circuit. The converting unit 430 may convert the electrical connection of capacitors to a series connection for transmission by the transmitting unit 420. In this example, the first switch unit 431 may turn ON the electrical connection between the capacitors and a transmission coil (L). The second switch unit 433 may turn ON the electrical connection between the capacitors. The third switch unit 435 may turn OFF the electrical connection between the capacitors and the ground. When a respective capacitance of each of the capacitors is N*C and the number of capacitors is N, a total capacitance of the capacitors connected in series is C.

Figure 5:
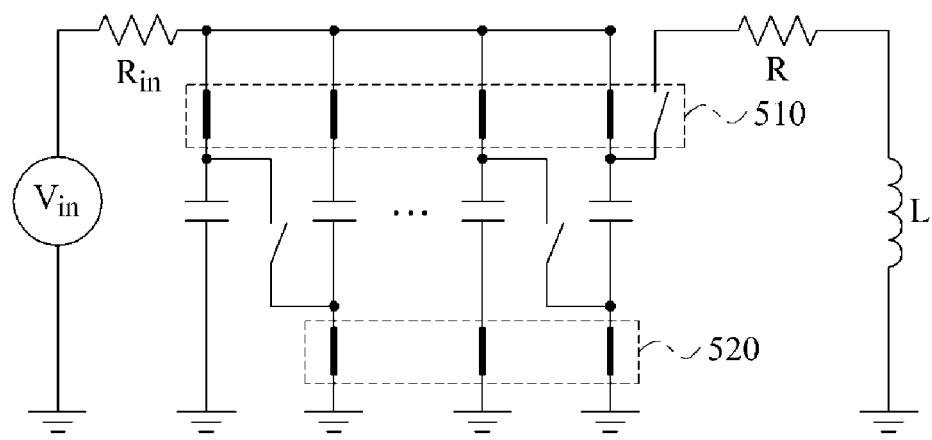
FIG. 5 is a diagram illustrating an example in which capacitors are connected in parallel in a wireless power transmitter according to example embodiments.

FIG. 5 illustrates an example in which capacitors are connected in parallel in a wireless power transmitter according to example embodiments.

Referring to FIG. 5, a switch unit 510 may turn ON switches between a power input unit and capacitors, and may turn OFF switches between a power transmitting unit and the capacitors. In this example, switches between the capacitors are turned OFF. The switch unit 520 may turn ON switches between the capacitors and a ground. Here, the capacitors may be connected to the power input unit in parallel by the switching operation.

Figure 6:
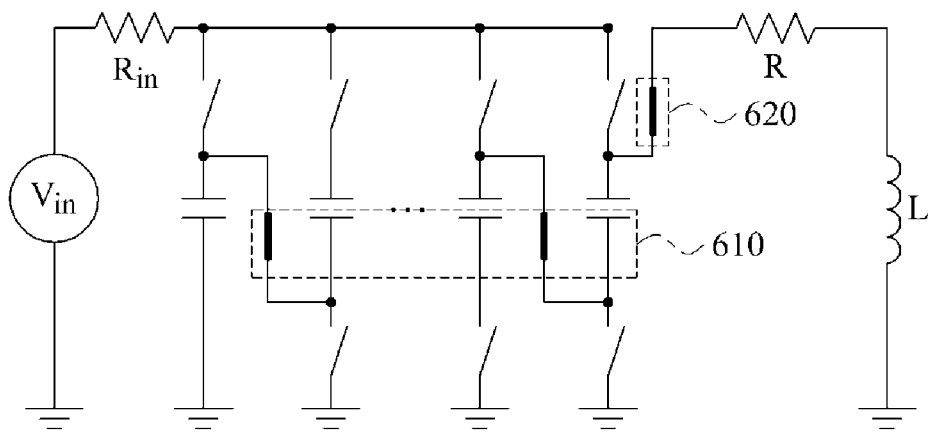
FIG. 6 is a diagram illustrating an example in which capacitors are connected in series in a wireless power transmitter according to example embodiments.

FIG. 6 illustrates an example in which capacitors are connected in series in a wireless power transmitter according to example embodiments.

Referring to FIG. 6, a switch unit 620 may turn ON switches between a power transmitting unit and capacitors. The switch unit 610 may turn ON switches between the capacitors. In this example, switches between the capacitors and a ground may be turned OFF. A first end of the capacitors connected in series may be connected to ground. Here, the capacitors may be connected to the power transmitting unit in series by the switching operation.

Figure 7:
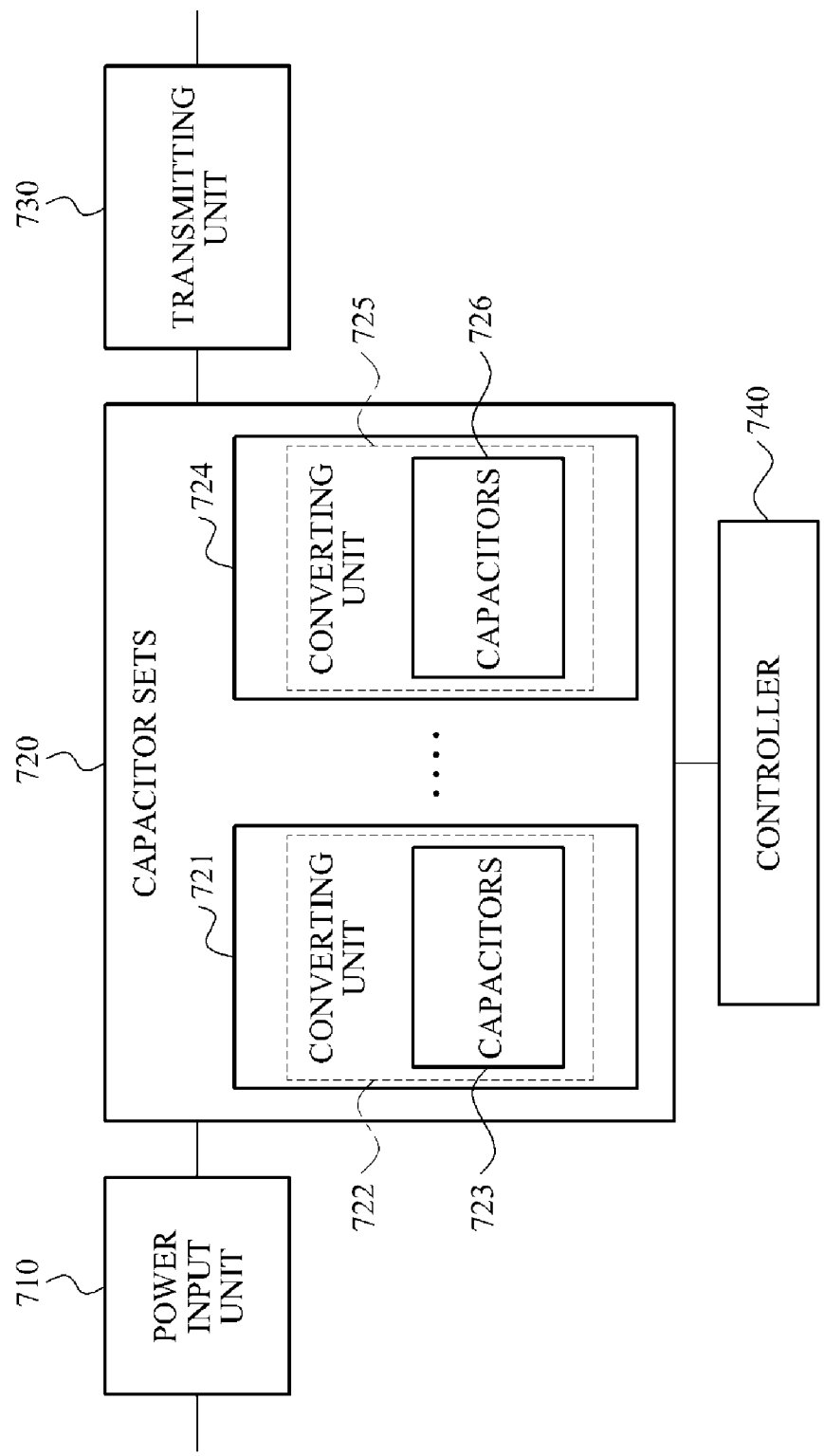
FIG. 7 is a block diagram illustrating a data transmitter that may transmit wireless power, according to example embodiments.

FIG. 7 illustrates a data transmitter that may transmit wireless power, according to example embodiments.

Referring to FIG. 7, the data transmitter includes a power input unit 710, capacitor sets 720, a transmitting unit 730, and a controller 740.

The power input unit 710 may charge the capacitor sets 720 with power supplied from a power supply. The capacitor sets 720 may include a capacitor set 721 and a capacitor set 724, and may also include additional capacitor sets. The capacitor sets 721 and 724 may store different amounts of power. Here, each capacitor set may include a different number of capacitors, that is, the capacitor set 721 may include capacitors 723 and the capacitor set 724 may include capacitors 726. When the number of capacitors 723 included in the capacitor set 721 and the number of capacitors 724 included in the capacitor set 724 are different from each other, and each capacitor has the same capacitance, an amount of power stored in the capacitor set 721 and an amount of power stored in the capacitor set 724 may be different from each other.

The power supply may be included in the power input unit 710 or may be positioned at an external side of the power input unit 710. The power input unit 710 may charge capacitors with power supplied from a DC power supply or an AC power supply. The power input unit 710 may charge the capacitor sets 720 with power supplied from a single power supply.

The power input unit 710 may readily charge the capacitors if a DC power supply is provided. Although the power input unit 710 uses the AC power supply, the power input unit 710 may charge the capacitors by converting an AC power to a DC power using an AC/DC converter or by adding a switch and adjusting a timing of the switch.

The capacitor sets 721 and 724 include the capacitors 723 and the capacitors 726, respectively. Here, electrical connections of the capacitors 723 and the capacitors 726 may be converted by converting units 722 and 725, respectively.

The converting unit 722 in the capacitor set 721 may convert an electrical connection of the capacitors 723. The converting unit 722 may convert the electrical connection of the capacitors 723 to a parallel connection for connecting the capacitors 723 to the power input unit 710. The converting unit 722 may convert the electrical connection of the capacitors 723 to a series connection for connecting the capacitors 723 to the transmitting unit 730.

The converting unit 725 in the capacitor set 724 may convert an electrical connection of the capacitors 726. The converting unit 725 may convert the electrical connection of the capacitors 726 to a parallel connection for connecting the capacitors 726 to the power input unit 710. The converting unit 725 may convert the electrical connection of the capacitors 726 to a series connection for connecting the capacitors to the transmitting unit 730.

The converting units 722 and 725 may change the electrical connection of the capacitors by turning ON and OFF switches connected to the capacitors. Here, information associated with which switches to be turned ON and OFF among the switches connected to the capacitors may be provided from the controller 740. The controller 740 may generate a control signal so that the converting units 722 and 725 control turning ON and OFF the switches connected to the capacitors. The controller 740 may measure or sense energy stored in the capacitors. In this example, the stored energy may be measured by a measuring device or may be sensed by a sensor.

The power input unit 710 may charge the capacitor sets 721 and 724 in a selective or simultaneous manner. In particular, the power input unit 710 may charge the capacitors connected to the power input unit 710 in parallel.

When the capacitors are connected to the power input unit 710 in parallel, substantially the same voltage may be applied to the capacitors. When the electrical connection of the capacitors is converted to a series connection by the converting unit 722 and the converting unit 725, a voltage applied to the capacitor set 721 may be different from a voltage applied to the capacitor set 724, since the number of capacitors 723 included in the capacitor set 721 may be different from the number of capacitors 726 included in the capacitor set 724.

For example, if the capacitor set 721 includes two capacitors, and the capacitor set 724 includes three capacitors, a voltage of 1V may be applied by the power input unit 710 to each of the two capacitors connected in parallel and a voltage of 1V may be applied to each of the three capacitors connected in parallel. When the two charged capacitors of the capacitor set 721 are connected in series, the voltage applied to the capacitor set 721 may be 2V. When the three charged capacitors of the capacitor set 724 are connected in series, the voltage applied to the capacitor set 724 may be 3V.

Here, the transmitting unit 730 may transmit data modulated based on an amount of power stored in the capacitor sets 721 and 724. The capacitor sets 721 and 724 may modulate data according to different voltages, respectively, since voltages applied to the capacitor sets 721 and 724 may be different from each other. The transmitting unit 730 may be connected to a capacitor set having a voltage to which a desired data is mapped, so as to transmit the desired data. The controller 740 may provide, to the transmitting unit 730, information associated with the voltages applied to the respective capacitor sets 721 and 724. The controller 740 may also provide, to the transmitting unit 730, information associated with data mapped to the respective voltages. The controller 740 may control the converting units 722 and 725 so as to connect the transmitting unit 730 to a capacitor set to which a corresponding voltage is applied.

The controller 740 may electrically connect the transmitting unit 730 to a predetermined number of capacitors among the capacitors 723 and 726 and thus, may control a resonance frequency of a source resonator. The resonance frequency of the source resonator may change based on a number of capacitors connected to the transmitting unit 730. When a wireless power receiver other than a target for wireless power transmission receives power, the controller 740 may change a resonance frequency so as to block the reception of power by this receiver. The controller 740 may also reduce interference from another wireless power receiver by changing the resonance frequency. A scheme of the controller 740 that changes the resonance frequency by electrically connecting a predetermined number of capacitors to the transmitting unit 730 in series may be applicable to another communication scheme.

The capacitors may be disconnected from the transmitting unit 730 while the capacitors are connected to the power input unit 710. The power input unit 710 and the transmitting unit 730 may be disconnected by turning ON and OFF switches of the converting units 722 and 725. The controller 740 may generate a control signal that controls the converting units 722 and 725 to physically separate the power input unit 710 and the transmitting unit 730.

The transmitting unit 730 may transmit power transferred to the source resonator through magnetic coupling. When capacitors that are charged and connected in series are connected to the source resonator, the transmitting unit 730 may transmit the power stored in the capacitors through magnetic coupling. The transmitting unit 730 may transmit different amounts of power based on the connected capacitor sets 721 and 724 and thus, may transmit the modulated data.

The power input unit 710 and the transmitting unit 730 may operate independently. Accordingly, the power input unit 710 and the transmitting unit 730 may reduce effects of an operating environment of a wireless power transmitter.

Figure 8:
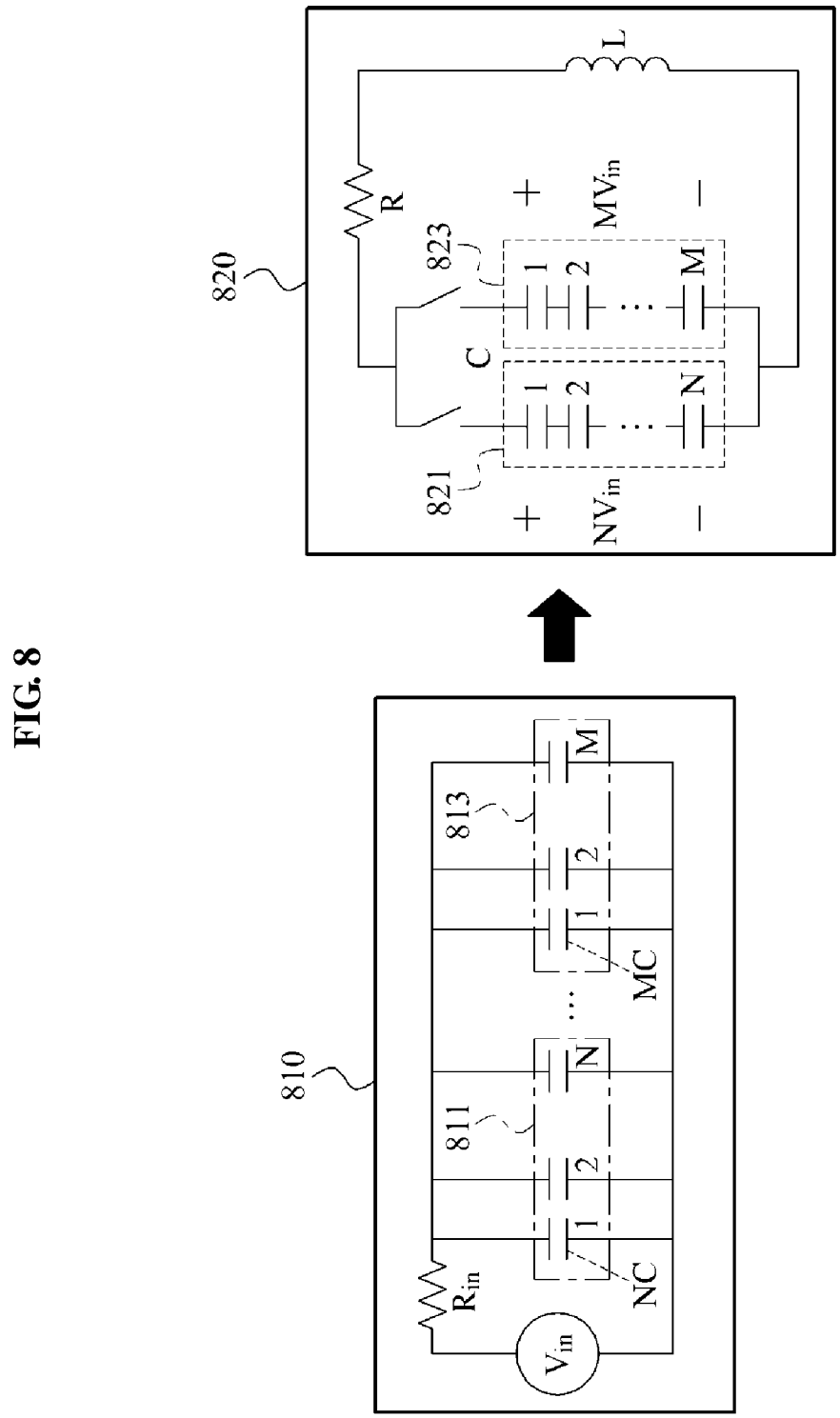
FIG. 8 is a diagram illustrating a data transmitter that may transmit wireless power, according to example embodiments.

FIG. 8 illustrates a data transmitter that may transmit wireless power, according to example embodiments.

Referring to FIG. 8, a power input unit 810 may charge a capacitor set 811 and a capacitor set 813. The capacitor set 811 includes N capacitors connected in parallel. In this example, a respective capacitance of each of the N capacitors may be N*C. The capacitor set 813 includes M capacitors connected in parallel. In this example, a respective capacitance of each of the M capacitors may be M*C.

Here, when the respective capacitance of each of the N capacitors is N*C, a total capacitance of the capacitor set 811 may be N*N*C. Further, when the respective capacitance of each of the M capacitors is M*C, a total capacitance of the capacitor set 813 may be M*M*C.

When the respective capacitance of each of the N capacitors is N*C, a total capacitance of a capacitor set 821 may be C. When the respective capacitance of each of the M capacitors is M*C, a total capacitance of a capacitor set 823 may be C. Since a total capacitance of the capacitors connected in series may be C, a source resonator of a transmitting unit 820 may maintain substantially the same resonance frequency, irrespective of whether the source resonator is connected to the capacitor set 821 or the capacitor set 823.

When the N capacitors are connected in parallel, substantially the same voltage may be applied from an input voltage ($V_{in}$) to each capacitor. Also, when the M capacitors are connected in parallel, substantially the same voltage may be applied from $V_{in}$ to each capacitor.

A voltage applied to the capacitor set 821 in which the N capacitors are connected in series may be determined as $N*V_{in}$. A voltage applied to the capacitor set 823 in which the M capacitors are connected in series may be determined as $M*V_{in}$. A voltage applied to the capacitor set 821 may change based on a number of capacitors included in the capacitor set 821, and a voltage applied to the capacitor set 823 may change based on a number of capacitors included in the capacitor set 823.

The transmitting unit 820 may transmit data modulated based on an amount of power stored in the capacitor set 821 or the capacitor 823. The data may be modulated based on a quantized voltage applied to the capacitor set 821 and a quantized voltage applied to the capacitor set 823.

Figure 9:
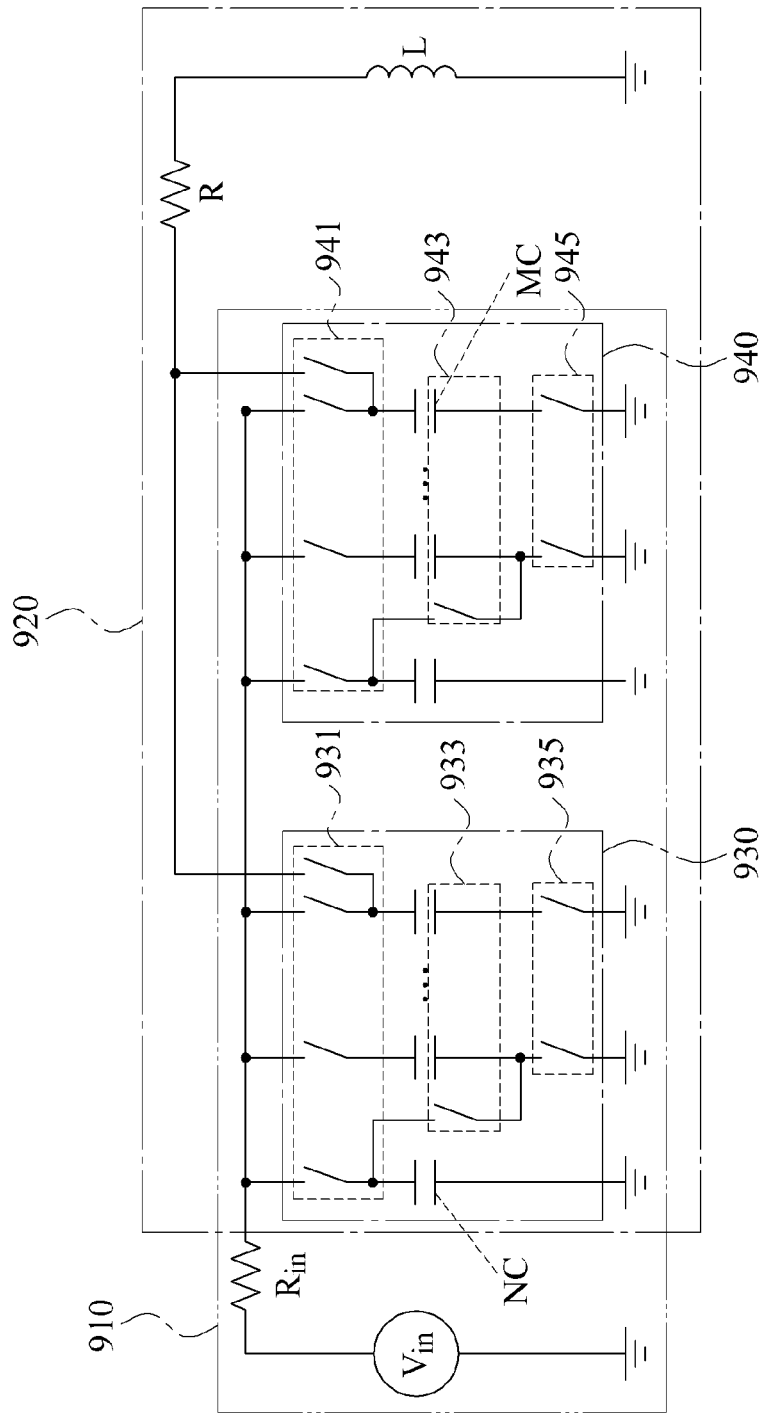
FIG. 9 is a diagram illustrating an example of a data transmitter that may transmit wireless power, according to example embodiments.

FIG. 9 illustrates an example of a data transmitter that may transmit wireless power, according to example embodiments.

Referring to FIG. 9, the data transmitter using the wireless power may include a power input unit 910, a transmitting unit 920, and capacitor sets 930 and 940.

The power input unit 910 may charge the capacitor sets 930 and 940 with power supplied from an input voltage ($V_{in}$). In this example, a converting unit in a capacitor set, for example, the capacitor set 930 or the capacitor set 940, may convert an electrical connection of the capacitors to a parallel connection. When the capacitors are connected in parallel, substantially the same voltage may be applied from $V_{in}$ to the capacitors connected in parallel. The converting unit may include first switches units 931 and 941, second switch units 933 and 943, and third switch units 935 and 945. In this example, the first switch units 931 and 941 may turn ON an electrical connection between the capacitors and input voltage $V_{in}$. The second switch units 933 and 943 may turn OFF an electrical connection between the capacitors. The third switch units 935 and 945 may turn ON an electrical connection between the capacitors and a ground.

Here, when a respective capacitance of each of the capacitors in the capacitor set 930 is N*C, and a number of the capacitors is N, a total capacitance of the capacitors connected in parallel may be N*N*C. Further, when a respective capacitance of each of the capacitors in the capacitor set 940 is M*C, and a number of the capacitors is M, a total capacitance of the capacitors connected in parallel may be M*M*C.

The transmitting unit 920 may transmit power stored in the capacitors through magnetic coupling between a source resonator and a target resonator. The source resonator may be approximated as a series RLC circuit. The converting unit may convert an electrical connection of capacitors to a series connection for connection to the transmitting unit 920. In this example, the first switch units 931 and 941 may turn ON the electrical connection between the capacitors and a transmission coil (L). The second switch units 933 and 943 may turn ON an electrical connection between the capacitors. The third switch units 935 and 945 may turn OFF an electrical connection between the capacitors and a ground.

When a respective capacitance of each of the capacitors in the capacitor set 930 is N*C, and a number of the capacitors is N, a total capacitance of the capacitors connected in series may be C. When a respective capacitance of each of the capacitors in the capacitor set 940 is M*C, and a number of the capacitors is M, a total capacitance of the capacitors connected in series may be C.

A voltage applied to the capacitor set 930 when the capacitors are connected in series may be $N*V_{in}$, and a voltage applied to the capacitor set 940 when the capacitors are connected in series may be $M*V_{in}$. The transmitting unit 920 may transmit data modulated based on a difference in voltage of the capacitor sets.

Figure 10:
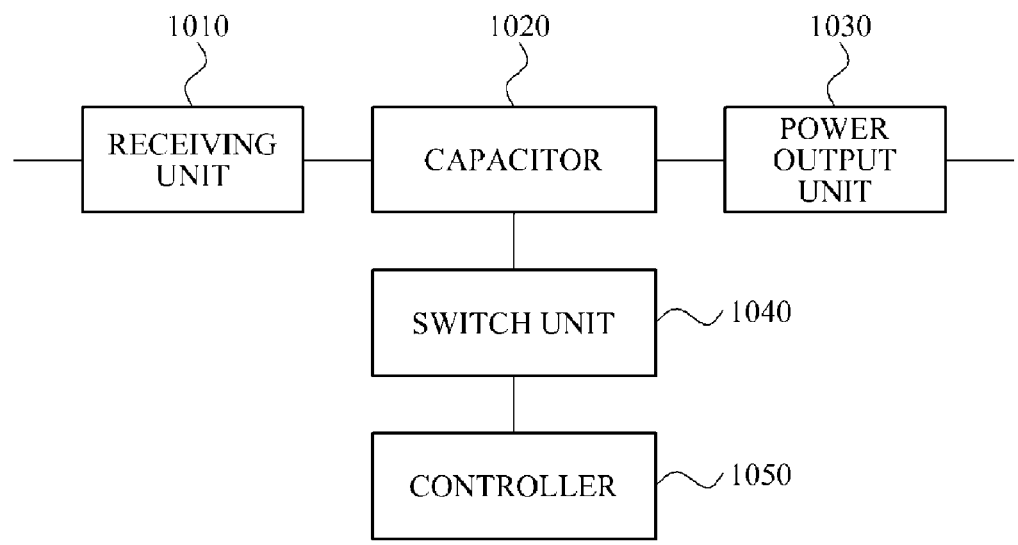
FIG. 10 is a block diagram illustrating a wireless power receiver according to example embodiments.

FIG. 10 illustrates a wireless power receiver according to example embodiments.

Referring to FIG. 10, the wireless power receiver includes a receiving unit 1010, a capacitor 1020, a power output unit 1030, a switch unit 1040, and a controller 1050.

The receiving unit 1010 may receive a wireless power and may charge at least one capacitor, for example, the capacitor 1020. The receiving unit 1010 may receive wireless power using a target resonator. A connection between the capacitor 1020 and the receiving unit 1010 may be controlled by turning a switch ON or OFF. The capacitor 1020 may be disconnected from the power output unit 1030 while the capacitor 1020 and the receiving unit 1010 are connected. The receiving unit 1010 and the power output unit 1030 may be disconnected by a switching operation of the switch unit 1040.

As a Q value of the target resonator increases, the target resonator may more effectively receive wireless power from the source resonator. The Q value of the target resonator may be determined based on a capacitance of the capacitor 1020 connected to the target resonator. As a capacitance of the capacitor 1020 decreases, the Q value of the target resonator may increase. An equivalent capacitor having a low capacitance may be configured based on a structure in which a plurality of capacitors is connected in series. Therefore, the capacitor 1020 may correspond to an equivalent capacitor in which a plurality of capacitors is connected in series.

A capacity of a capacitor may be relatively high to effectively transfer power to a target device. An equivalent capacitor having a relatively high capacitance may be configured based on a structure in which a plurality of capacitors is connected in parallel. The switch unit 1040 may enable the plurality of capacitors to be connected in series or in parallel based on operation of controller 1050. The switch unit 1040 may connect the plurality of capacitors in series when the capacitors are connected to the receiving unit 1010, and may connect the plurality of capacitors in parallel when the capacitors are connected to the power output unit 1030.

Here, power stored in the capacitor 1020 may be transferred to a target device when the capacitor 1020 is connected to the power output unit 1030. The charged capacitor 1020 may not be connected to the receiving unit 1010 while the capacitor 1020 is connected to the power output unit 1030.

The power output unit 1030 may transfer the power stored in the capacitor 1020 to the target device. The capacitor 1020 may be connected to the target device through the switch unit 1040.

The controller 1050 may sense the power stored in the capacitor 1020, and may control the capacitor 1020 to be connected to the power output unit 1030 when the power is greater than a predetermined value. Here, the predetermined value may be set to be a substantially maximum value of an amount of power that the capacitor 1020 can store. Whether the power stored in the capacitor 1020 reaches the substantially maximum value may be determined based on whether a first-order derivative of the stored power is approximately zero. When a difference between currently stored power and power stored during a sampling time is less than a predetermined value, it may be determined that the currently stored power may reaches the substantially maximum value.

The controller 1050 may sense the power stored in the capacitor 1020 connected to the power output unit 1030, and may control the switch unit 1040 to connect the capacitor 1020 to the receiving unit 1010 when the capacitor 1020 is discharged to a level less than or equal to a predetermined value or when a predetermined time passes after the sensing. Here, the predetermined value may indicate that the power is substantially completely discharged and a level of power is substantially zero. The predetermined time may be a time set in the controller 1050 in advance.

In the wireless power receiver, the receiving unit 1010 and the power output unit 1030 may be separated by the switching unit 1040. The receiving unit 1010 may charge the connected capacitor 1020, where the capacitor 1020 may be an equivalent capacitor corresponding to a plurality of capacitors connected in series. The power output unit 1030 may transfer power stored in the connected capacitor 1020 to the target device, where the capacitor 1020 may be an equivalent capacitor corresponding to a plurality of capacitors connected in parallel. The receiving unit 1010 and the power output unit 1030 may be physically separated from each other and thus, the receiving unit 1010 and the power output unit 1030 may operate independently. Accordingly, the receiving unit 1010 and the power output unit 1030 may reduce the effects of a change in an operating environment. The receiving unit 1010 may use a capacitor and thus, may transfer power to the target device without using a rectifier.

Figure 11:
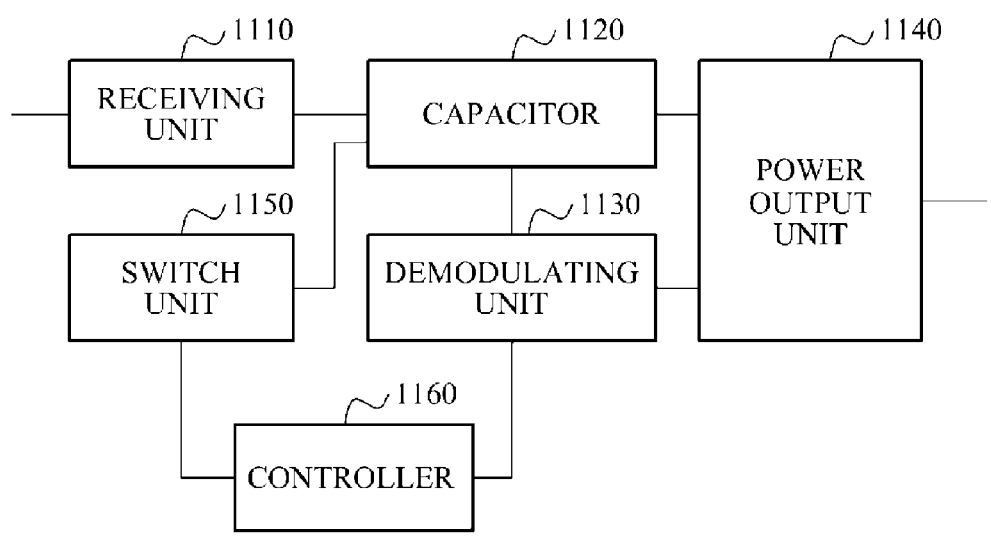
FIG. 11 is a block diagram illustrating a data receiver that may receive wireless power, according to example embodiments.

FIG. 11 illustrates a data receiver that may receive wireless power, according to example embodiments.

Referring to FIG. 11, the data receiver includes a receiving unit 1110, a capacitor 1120, a demodulating unit 1130, a power output unit 1140, a switch unit 1150, and a controller 1160.

The receiving unit 1110 may charge at least one capacitor, for example, the capacitor 1120, by receiving a wireless power. The receiving unit 1110 may receive wireless power through magnetic coupling between a target resonator and a source resonator. The demodulating unit 1130 may demodulate modulated data, based on an amount of power stored in the capacitor 1120. A data transmitter may modulate data by mapping data for each quantized voltage. Therefore, the data receiver may demodulate the modulated data based on a charging voltage used for charging the capacitor 1120. The controller 1160 may provide, to the demodulating unit 1130, information associated with the data mapped for each quantized voltage.

The power output unit 1140 may transfer, to a load, power stored in the capacitor 1120 and the data demodulated by the demodulating unit 1130. The load may include a target device and a battery. The capacitor 1120 may not be connected to the power output unit 1140 while the capacitor 1120 is connected to the receiving unit 1110, and may not be connected to the receiving unit 1110 while connected to the power output unit 1140.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described controller to perform an operation or a method may be hardware, software, or some combination of hardware and software. For example, the unit may be a software package running on a computer or the computer on which that software is running.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter, comprising:
   a source resonator configured to wirelessly transmit a charging power across an air-gap to an outside;
   a plurality of capacitors; and
   a converting unit comprising a processor configured to convert an electrical connection of the plurality of capacitors to a parallel connection when charging the plurality of capacitors, and to convert an electrical connection of at least two capacitors of the plurality of capacitors to a series connection when discharging the plurality of capacitors to the source resonator for wireless transmission, wherein a resonance frequency of the source resonator is controlled based on the conversion of the electrical connection.

2. The wireless power transmitter of claim 1, further comprising: a power input unit configured to charge the plurality of capacitors, connected in parallel, with power supplied from a power supply; and a power transmitting unit configured to transmit power stored in the at least two capacitors of plurality of capacitors, connected in series.

3. The wireless power transmitter of claim 1, wherein: the converting unit is further configured to convert an electrical connection of the plurality of capacitors to the parallel connection, and convert the electrical connection of the plurality of capacitors from the parallel to the series connection; a power input unit charges the plurality of capacitors, connected in parallel, with power supplied from the power supply; and a power transmitting unit configured to transmit power stored in the plurality of capacitors, connected in series.

4. The wireless power transmitter of claim 1, wherein each of the plurality of capacitors has substantially the same capacitance.

5. The wireless power transmitter of claim 2, further comprising: a controller configured to control switches connected to the plurality of capacitors, wherein, when the plurality of capacitors are charged with a predetermined amount of power, the controller controls the switches to change the plurality of capacitors from the parallel connection to the series connection.

6. The wireless power transmitter of claim 3, wherein: the converting unit is configured electrically connects the plurality of capacitors to the power input unit when the plurality of capacitors are connected in parallel; and the converting unit electrically connects the plurality of capacitors to the power transmitting unit when the plurality of capacitors are connected in series.

7. The wireless power transmitter of claim 1, wherein the converting unit comprises: a first switch unit configured to control an electrical connection between the power input unit and the plurality of capacitors and to control an electrical connection between the power transmitting unit and the plurality of capacitors; a second switch unit configured to control an electrical connection between the plurality of capacitors; and a third switch unit configured to control an electrical connection between the plurality of capacitors and a ground.

8. The wireless power transmitter of claim 5, wherein the controller electrically connects, in series, the power transmitting unit to a predetermined number of capacitors of the plurality of capacitors, wherein the predetermined number of capacitors is selected to control a resonance frequency of the source resonator.

9. A method of wirelessly transmitting power, comprising:
   charging a first capacitor unit from a power supply;
   actuating a processor to disconnect the first capacitor unit from the power supply and connecting the first capacitor unit to a transmission coil configured to wirelessly transmit a charging power across an air-gap to an outside;
   discharging the first capacitor unit to transmit power from the transmission coil to a reception coil;
   charging a second capacitor unit from the reception coil; and,
   disconnecting the second capacitor unit from the reception coil and connecting the second capacitor unit to a load; and discharging the second capacitor unit to supply power to the load, wherein a resonance frequency of the transmission coil is controlled based on conversion of the electrical connection of a plurality of capacitors included in the first capacitor unit.

10. The method of claim 9, the method further comprising: connecting the plurality of capacitors in a parallel manner when the first capacitor unit is charged from the power supply; and connecting at least a portion of the plurality of capacitors in a series manner when the first capacitor unit is discharged to the transmission coil.

11. The method of claim 9, further comprising: modulating data based on an amount of power stored in the first capacitor unit; transmitting the modulated data from the transmission coil to the reception coil; and demodulating the modulated data based on an amount of power stored in the second capacitor unit.

* * * * *